United States Patent

Krukow

[11] Patent Number: 5,154,258
[45] Date of Patent: Oct. 13, 1992

[54] LOCKABLE LADDER SECURING BRACKET

[76] Inventor: Carl D. Krukow, 6615 Alisal St., Pleasanton, Calif. 94566

[21] Appl. No.: 695,518

[22] Filed: May 3, 1991

[51] Int. Cl.$^5$ .............................................. E05B 73/00
[52] U.S. Cl. ..................... 182/127; 248/509; 248/552; 248/316.4; 248/503; 224/323
[58] Field of Search ............... 182/127; 224/323, 324; 70/212; 292/60, 67, 68, 205; 248/509, 552, 553, 500, 316.4, 503

[56] References Cited

U.S. PATENT DOCUMENTS

| 629,959 | 8/1899 | Glahn | 292/60 |
|---|---|---|---|
| 1,370,585 | 3/1921 | Hawthorne | 248/552 |
| 1,826,893 | 10/1931 | Larsen | 182/127 X |
| 2,134,823 | 11/1938 | Herrmann et al. | 248/509 |
| 2,237,853 | 4/1941 | Troche | 182/127 |
| 2,606,732 | 8/1952 | Luomala | 248/154 |
| 4,827,742 | 5/1989 | McDonald | 182/127 X |

FOREIGN PATENT DOCUMENTS 98156  5/1924  Austria ................................ 248/509

Primary Examiner—Alvin C. Chin-Shue
Attorney, Agent, or Firm—Henry P. Sartorio

[57] ABSTRACT

A ladder sitting on a rack is secured in position by a spring loaded pivoting arm which engages a ladder rung and is secured in position. The pivoting arm is mounted in a housing which is attached to the rack. The pivoting arm is locked into place to prevent removal of the ladder. A second arm engaging a siderail prevents the ladder from being swung out from under the pivoting arm. To release the ladder, the lock is removed and the pivoting arm is raised and rotated clear of the ladder. A second housing can be attached to the rack spaced from the first housing. A spring loaded pivoting arm from the second housing engages a siderail of the ladder and is secured in place.

8 Claims, 2 Drawing Sheets

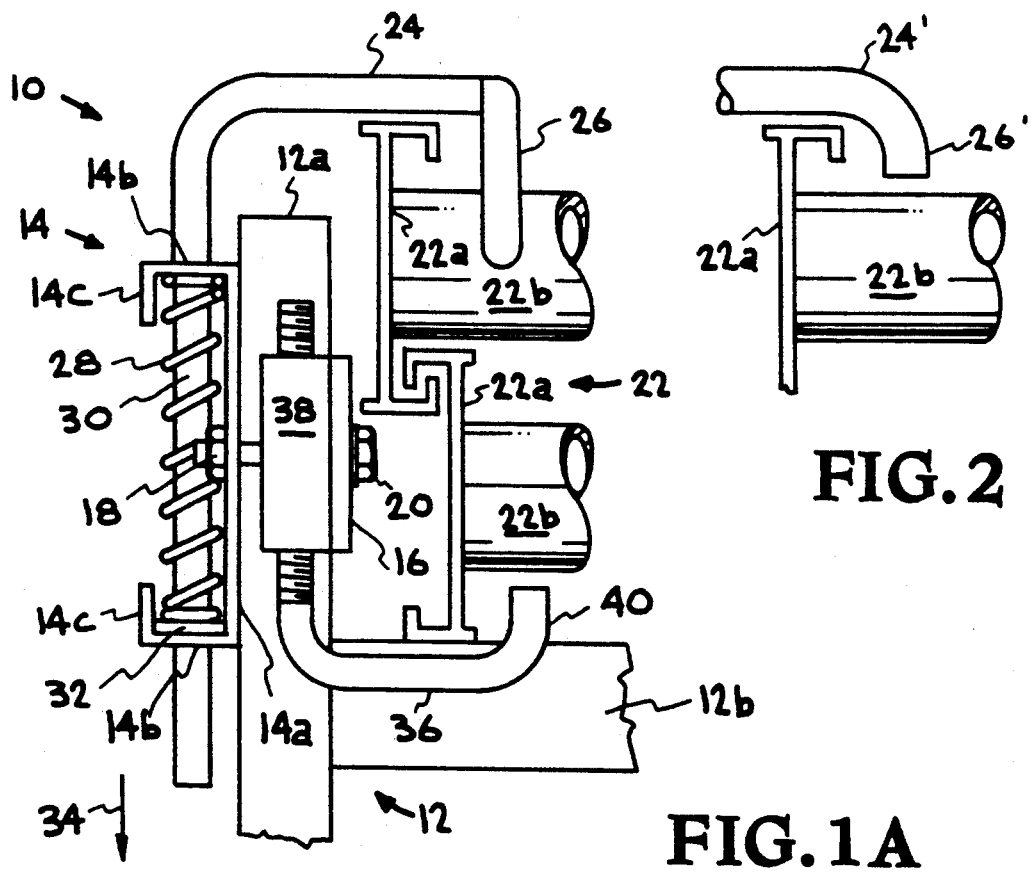
FIG. 2
FIG. 1A
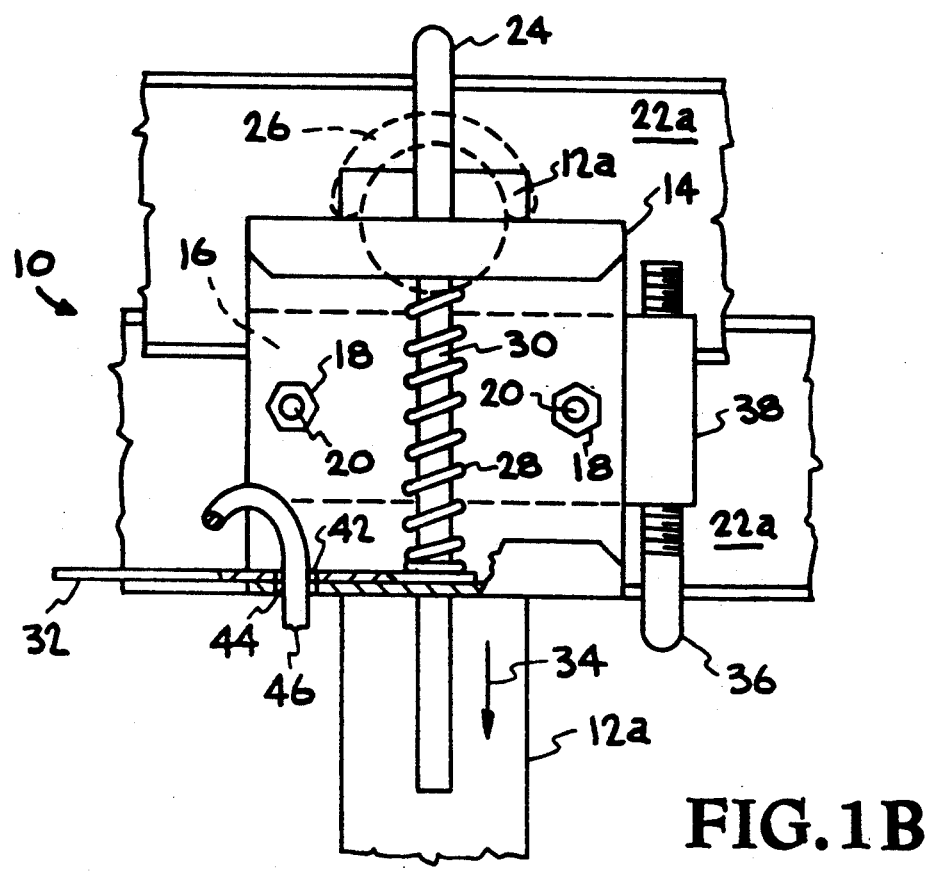
FIG. 1B

LOCKABLE LADDER SECURING BRACKET

BACKGROUND OF THE INVENTION

The invention relates generally to attachment brackets for vehicles, and more particularly to attachment brackets for holding ladders on vehicles.

Ladders are commonly used in various construction projects, and therefore must be transported to and from the work site. Many trucks and other vehicles used to transport equipment have racks on which a ladder may be placed. However, these racks do not include means for securing the ladder. Thus, ladders are frequently just tied to the vehicle, and may become loose during transport and fall into the road, where they may be lost, damaged or even cause accidents. Furthermore, while the vehicle is unattended, a thief can untie and remove the ladder. Therefore, an improved attachment bracket for holding a ladder on a vehicle, and preventing its unauthorized removal, would be highly advantageous. The bracket should be easy to use and simple and rugged enough to survive in the often dirty environment of a construction site.

SUMMARY OF THE INVENTION

Accordingly it is an object of the invention to provide an improved bracket for holding a ladder on a vehicle.

It is also an object of the invention to provide a ladder securing bracket which can be locked to prevent ladder removal.

It is another object of the invention to provide a ladder attachment bracket which is simple and rugged in design, and which is easy to use.

The invention is a ladder securing bracket which is mounted on a vehicle and which includes a spring loaded pivoting arm which clamps down over a ladder rung to hold the ladder in place. The pivoting arm is L-shaped and is attached to a lever which can be locked in place to lock the ladder in position. A second arm prevents the ladder from swinging out under the L-shaped arm. On a vehicle a second bracket of similar design will usually also be used, but the second bracket does not need to engage the ladder rung or be lockable.

BRIEF DESCRIPTION OF THE DRAWINGS

In the accompanying drawings:

FIG. 1A is an end view of a locking bracket holding a ladder on a vehicle rack.

FIG. 1B is a side view, partly in section, of the locking bracket holding a ladder on a rack.

FIG. 2 is an end view of a portion of a second bracket used in combination with a locking bracket.

DETAILED DESCRIPTION OF THE PREFERRED EMBODIMENTS

Figure 3:
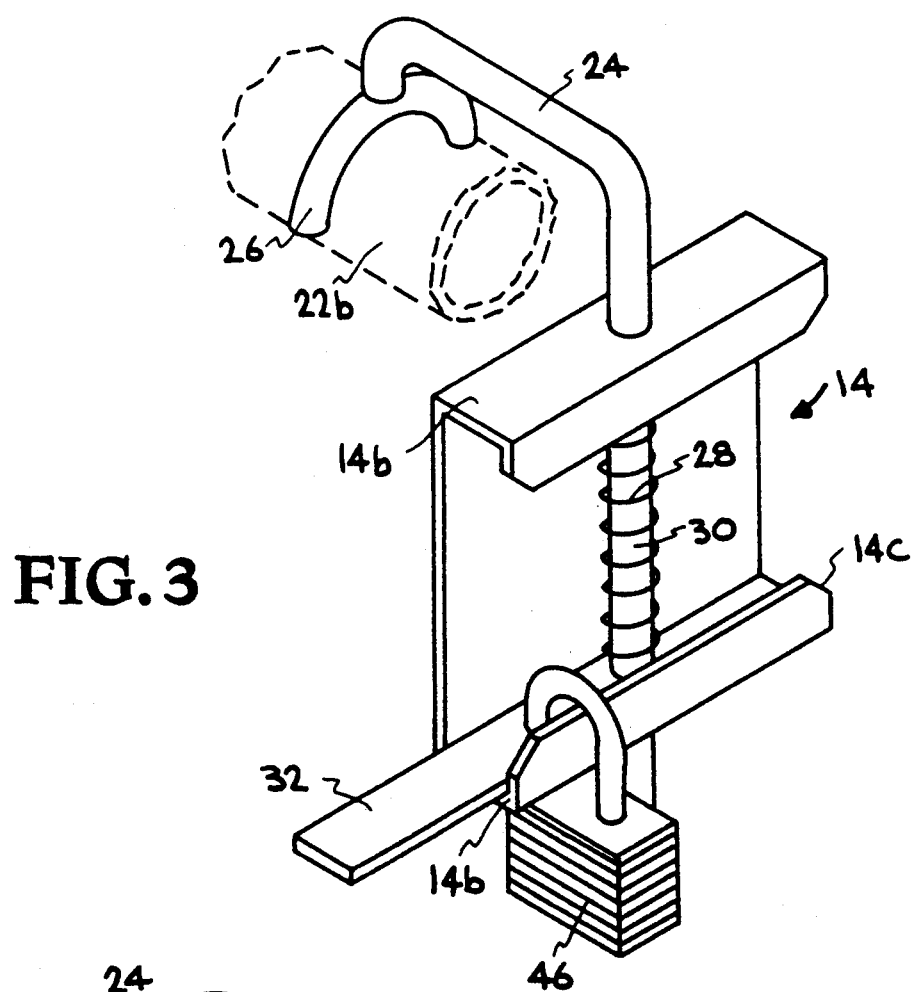
FIG. 3 is a perspective view of the bracket in the locked and secured position.

As shown in FIGS. 1A and B, a ladder securing and locking bracket 10 is mounted to an equipment rack 12 of a type commonly found on trucks. Rack 12 has a verticle member 12a and a connected horizontal member 12b. The main body of bracket 10 is a channel or housing 14 which is fastened to an upright portion 12a of rack 12 by a clamp 16. Channel (housing) 14 has a back wall 14a and a pair of end walls 14b extending at right angles from the ends of back wall 14a. A pair of front flanges 14c extend at right angles from the ends of end walls 14b. Back wall 14a contacts verticle member 12a and is clamped thereto by a pair of fasteners 20 which extend through clamp 16 and engage retainers 18 in channel 14 (through suitable holes through back wall 14a if necessary). Clamp 16 with fasteners 20 and retainers 18 form attachment means for attaching the bracket housing to the rack. Fasteners 20 are typically threaded at the tips, e.g. bolts or internal wrenching screws, with one passing on either side of member 12a, and retainers 18 are also threaded, e.g. nuts, to engage fasteners 20. Retainers 18 may be an integral part of channel 14 or in some way secured thereto. Thus back wall 14a and clamp 16 are placed on opposed sides of verticle member 12a and tightly secured by fasteners 20 and retainers 18; once fastened they are not easily removed without appropriate tools.

A ladder 22, having siderails or frame 22a and rungs 22b, sits (lies flat on horizontal member 12b of rack 12. A securable spring loaded pivoting arm 24 is pivotably mounted in and extends from channel 14 and secures ladder 22 in position. Arm 24 is substantially L-shaped, and mounted in an inverted position. The horizontal leg has an end piece 26 which engages rung 22b of ladder 22 when bracket 10 is in the secured position. End piece 26 may have a semicircular shape, but could also be V-shaped (inverted or any other shape which can hold the rung 22b securely. End piece 26 forms the engagement means which engages and holds the ladder in place when arm 24 is secured.

A spring 28 surrounds a portion 30 of arm 24; the spring 28 is enclosed between end walls 14b of the channel 14. The spring 28 is compressed and exerts a force in the direction of arrow 34 on lever 32 which is fixedly attached to arm 24. Lever 32 is pushed by spring 28 against an end wall 14b of channel 14 so that end piece 26 engages rung 22b. Thus spring force from spring 28 is transmitted to ladder 22 by arm 24. Spring 28 is thus a forcing means for holding the engagement means against the ladder rung. Lever 32 can be raised and pivoted against the spring force, as further be described herein, so that arm 24 translates upward (through holes in end walls 14b) in channel 14 and pivots away from the ladder 22. Lever 32 forms the arm movement means by which arm 24 is moved. When lever 32 is against end wall 14b, flange 14c c prevents rotation of arm 24 so the ladder is secured; flange 14c forms securing means for holding the ladder in place since the ladder cannot slide with the arm 24 secured against rotation.

Although arm 24 with end piece 26 clamps ladder 22 to rack 12, it could be possible to swing the ladder out from under arm 24 by sliding the bottom of ladder 22 along horizontal rack member 12b. Therefore, a second arm 36 clamps the bottom of ladder 22. Arm 36 is generally J-shaped, having a long leg that is threaded and passes through a threaded block 38 which extends from clamp 16. Arm 36 has a short leg 40 which extends up around the bottom of ladder 22, against a siderail 22a, to prevent the ladder from being swung out from under arm 24. Lower arm 36 can be adjusted to its best position by turning arm 36 in block 38 before the ladder is placed in position.

As shown, ladder 22 is an extension ladder having two engaged siderails 22a; however bracket 10 can be used with any ladder. Brackets can be made with arms of different length; the bracket can also be mounted higher or lower on the rack by means of fasteners 20 and retainers 18. Lever 32 against end wall 14b provides an end point for arm 24 but arm 24 can be raised against spring tension for a larger ladder.

To lock arm 24 with end piece in engagement with rung 22b, a locking device 46 is passed through hole 42 in lever 32 and matching hole 44 in end wall 14b of channel 14. The locking device should not allow sufficient movement of lever 32 so that end piece 26 may be brought out of engagement and the ladder removed.

A vehicle will normally be equipped with a pair of spaced brackets, front and rear, to hold a ladder, but only one bracket, e.g. rear, need be a bracket 10 as described above which secures and locks the ladder. The second bracket can be similar but can omit several features. As shown in FIG. 2, arm 24' has a bent end 26' which does not engage rung 22b but merely holds siderail 22a in place until arm 24' is raised and swung clear of the ladder. A lock is not required nor is the lower arm 36 since the ladder can be locked in place merely by one bracket. The second bracket is used only to hold the other end of the ladder in place so that movement of the ladder does not bend the ladder or damage the locking and securing bracket.

Figure 4:
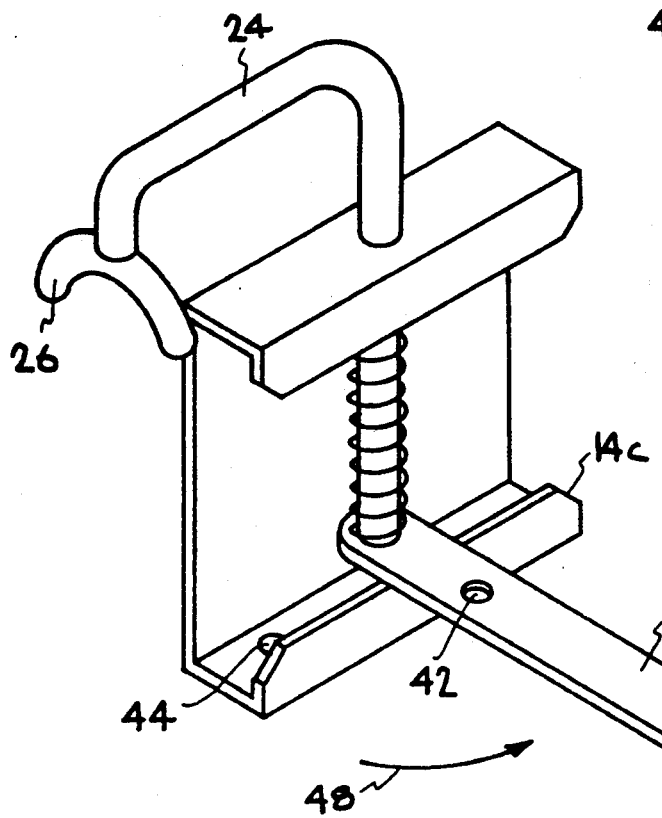
FIG. 4 is a perspective view of the bracket in the open position.

The operation of pivoting arm 24 is further illustrated in FIGS. 3 and 4 which show the locked and open positions, respectively. Lever 32 is forced down against end wall 14b by spring 28 which surrounds portion 30 of arm 24. A padlock or other locking means 46 passes through matching holes 42, 44 and prevents lever 32 from being lifted over flange 14c, and turned to swing arm 24 clear of the ladder, i.e. removing end piece 26 from engagement with rung 22b (shown in phantom). Thus the ladder is fully secured and locked by the locking device. When the locking device is removed, lever 32 can be raised clear of flange 14c which raises end piece 26 clear of the ladder rung so lever 32 can be rotated in the direction of arrow 48. By moving arm 24 clear of the ladder, the ladder can be removed.

Changes and modifications in the specifically described embodiments can be carried out without departing from the scope of the invention which is intended to be limited only by the scope of the appended claims.

I claim:

1. A ladder securing and locking bracket for holding a ladder horizontally flat on a horizontal member of a vehicle rack, comprising:
   a bracket housing comprising a three-wall channel having a vertical back wall and a pair of spaced parallel top and bottom end walls extending horizontally at right angles from the back wall;
   attachment means connected to the back wall of the housing for attaching the back wall of the housing to a vertical member of the rack;
   a pivoting arm translationally and pivotably mounted in the housing and passing through the top and bottom end walls;
   rung engagement means connected to an end of the pivoting arm for engaging a rung of the ladder;
   a compressed spring around the pivoting arm between the end walls of the housing;
   a horizontal lever attached to the pivoting arm and forced by the spring against the bottom end wall of the housing to hold the engagement means against the rung of the ladder, the lever being raisable against the spring for raising and rotating the arm against the spring to remove the engagement means from the ladder rung;
   a flange extending at right angles from the bottom end wall of the housing to prevent rotation of the lever and attached pivoting arm when the lever is forced by the spring against the bottom end wall and the engagement means are against the rung of the ladder.

2. The bracket of claim 1 further comprising locking means for locking the lever to the housing with the engagement means against the ladder rung.

3. The bracket claim 1 further comprising ladder restraining means which engage a siderail of the ladder to prevent the ladder from being swung out from under the pivoting arm when engaged by the engaging means.

4. The bracket of claim 1 wherein the engagement means is a semicircular end piece.

5. The bracket of claim 1 wherein the engagement means is a V-shaped end piece.

6. A ladder securing and locking bracket for holding a ladder horizontally flat on a horizontal member of a vehicle rack, comprising:
   a bracket housing;
   attachment means connected to the housing for attaching the housing to a vertical member of the rack;
   an L-shaped pivoting arm having a vertical leg translationally and pivotably mounted in and extending from the housing and a horizontal leg connected to the vertical leg;
   engagement means connected to an end of the horizontal leg of the pivoting arm for engaging a rung of the ladder when the horizontal leg of the arm is positioned over the ladder;
   a spring positioned in the housing around a length of the pivoting arm;
   a lever fixedly attached to the pivoting arm in the housing and opposed to the spring which forces the lever against the housing for holding the engagement means against the rung of the ladder and for raising and rotating the arm against the spring to remove the engagement means from the ladder rung;
   securing means positioned to prevent rotation of the lever when the engagement means are against the rung of the ladder;
   locking means for locking the lever to the housing with the engagement means against the ladder rung;
   a positionally adjustable J-shaped arm connected to the housing and engaging a siderail of the ladder to prevent the ladder from being swung out from under the pivoting arm when the engagement means are secured against the ladder rung.

7. The bracket of claim 6 wherein the locking means comprises a pair of aligned holes in the lever and housing, and a locking device which passes through the aligned holes.

8. Apparatus for securing a ladder to a vehicle rack, comprising:
   (a) a first bracket comprising:
       a first bracket housing;
       first attachment means connected to the first housing for attaching the first housing to the rack;
       a first pivoting arm translationally and pivotably mounted in the first housing;
       engagement means connected to an end of the first pivoting arm for engaging a rung of the ladder;
       a first compressed spring positioned in the first housing around the first pivoting arm;

a first horizontal lever attached to the first pivoting arm opposed to the first spring and forced by the spring against the housing to hold the engagement means against the rung of the ladder and for raising and rotating the arm against the first spring to remove the engagement means from the ladder rung;

a first flange in the housing to prevent rotation of the first lever and attached first pivoting arm when the engagement means are against the rung of the ladder;

locking means for locking the first lever to the first housing with the engagement means against the ladder rung so the first lever cannot be raised and rotated;

ladder restraining means which engage a siderail of the ladder to prevent the ladder from being swung out from under the first pivoting arm when a rung is engaged by the engaging means;

(b) a second bracket comprising:

a second bracket housing;

second attachment means connected to the second housing for attaching the second housing to the rack aligned with and spaced apart from the first housing;

a second pivoting arm translationally and pivotably mounted in the second housing and having an end shaped for engaging a siderail of the ladder;

a second compressed spring positioned in the second housing around the second pivoting arm;

a second horizontal lever attached to the second pivoting arm opposed to the second spring and forced by the spring against the housing to hold the end against the siderail and for raising and rotating the arm against the spring to remove the end from the siderail;

a second flange in the housing to prevent rotation of the second lever and attached second pivoting arm when the end is against the siderail.

* * * * *